US009713771B2

(12) United States Patent
Ohta

(10) Patent No.: US 9,713,771 B2
(45) Date of Patent: Jul. 25, 2017

(54) STORAGE MEDIUM HAVING GAME PROGRAM STORED THEREON, GAME APPARATUS AND INPUT DEVICE

(71) Applicant: NINTENDO CO., LTD., Kyoto (JP)

(72) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/911,780

(22) Filed: Jun. 6, 2013

(65) Prior Publication Data

US 2013/0267316 A1 Oct. 10, 2013

Related U.S. Application Data

(63) Continuation of application No. 11/159,342, filed on Jun. 23, 2005, now Pat. No. 9,492,746.

(30) Foreign Application Priority Data

Sep. 3, 2004 (JP) .................. 2004-257370

(51) Int. Cl.
| | | |
|---|---|---|
| *A63F 13/42* | (2014.01) | |
| *A63F 13/426* | (2014.01) | |
| *A63F 13/2145* | (2014.01) | |
| *A63F 13/98* | (2014.01) | |

(Continued)

(52) U.S. Cl.
CPC .......... *A63F 13/426* (2014.09); *A63F 13/02* (2013.01); *A63F 13/10* (2013.01); *A63F 13/2145* (2014.09); *A63F 13/42* (2014.09); *A63F 13/26* (2014.09); *A63F 2300/1075* (2013.01); *A63F 2300/301* (2013.01)

(58) Field of Classification Search
CPC ...... A63F 13/06; A63F 13/2145; A63F 13/42; A63F 2300/1075; G06F 3/03547; G06F 3/041; G06F 3/0412; G06F 3/0416; G06F 3/0488; G06F 2203/0339
USPC ...................... 463/36–39; 345/169, 173, 179
See application file for complete search history.

(56) References Cited

U.S. PATENT DOCUMENTS

| | | | |
|---|---|---|---|
| 5,327,161 | A | 7/1994 | Logan et al. |
| 5,696,532 | A | 12/1997 | Caprara |
| 5,777,605 | A | 7/1998 | Yoshinobu et al. |

(Continued)

FOREIGN PATENT DOCUMENTS

| | | |
|---|---|---|
| JP | 7-182092 | 7/1995 |
| JP | 11-53115 | 2/1999 |

(Continued)

OTHER PUBLICATIONS

Office Action dated Apr. 30, 2014 in U.S. Appl. No. 11/159,342.

(Continued)

*Primary Examiner* — Damon Pierce
(74) *Attorney, Agent, or Firm* — Nixon & Vanderhye, P.C,

(57) ABSTRACT

An example device includes a touchscreen and a processing system in communication with the touchscreen. The processing system is configured to perform operations including detecting a touch-on position on the touchscreen, setting a reference position based on the touch-on position, continuously detecting subsequent touch positions on the touchscreen after detecting the touch-on, and continuously performing operations based on one or both of a direction and a distance from the reference position to the subsequent touch positions.

16 Claims, 12 Drawing Sheets

(51) Int. Cl.
A63F 13/40 (2014.01)
A63F 13/26 (2014.01)

(56) References Cited

U.S. PATENT DOCUMENTS

| | | | |
|---|---|---|---|
| 6,196,917 | B1 | 3/2001 | Mathias et al. |
| 8,514,185 | B2 * | 8/2013 | Hotelling ..................... 345/173 |
| 8,552,990 | B2 * | 10/2013 | Marriott et al. .............. 345/173 |
| 8,749,493 | B2 * | 6/2014 | Zadesky et al. ............. 345/173 |
| 2004/0021643 | A1 * | 2/2004 | Hoshino et al. ............. 345/173 |
| 2004/0130525 | A1 * | 7/2004 | Suchocki ................ A63F 13/06 |
| | | | 345/156 |
| 2005/0012714 | A1 | 1/2005 | Russo et al. |
| 2005/0215323 | A1 | 9/2005 | Miyamoto et al. |

FOREIGN PATENT DOCUMENTS

| | | |
|---|---|---|
| JP | 11-110134 | 4/1999 |
| JP | 2002-000939 | 1/2002 |

OTHER PUBLICATIONS

Office Action dated Aug. 8, 2005 in counterpart JP Application No. 2004-257370.
Ohta, U.S. Appl. No. 11/159,342, filed Jun. 23, 2005, non-final office action mailed Jun. 15, 2015.
Office Action dated Feb. 8, 2016 in U.S. Appl. No. 11/159,342.
English-language machine translation of JP07-182092.
English-language machine translation of JP2002-000939.

* cited by examiner

F I G. 4
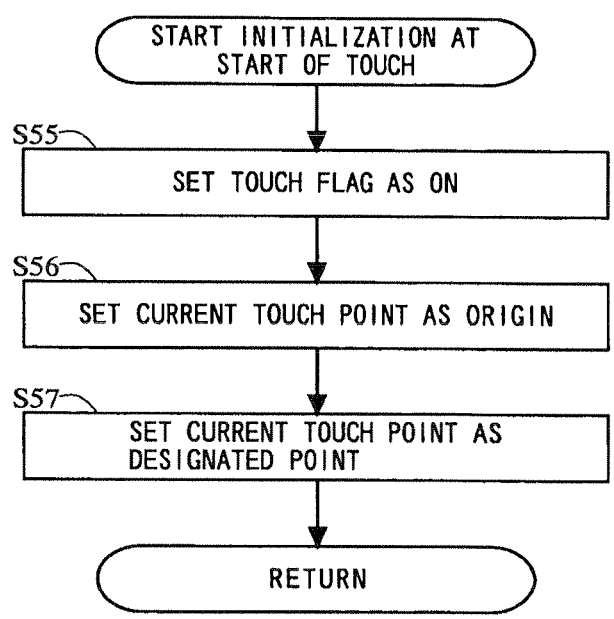

TOLERANCE RANGE

TOLERANCE RANGE

F I G. 1 0 A
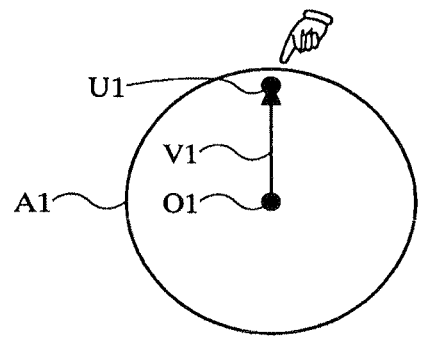
F I G. 1 0 B
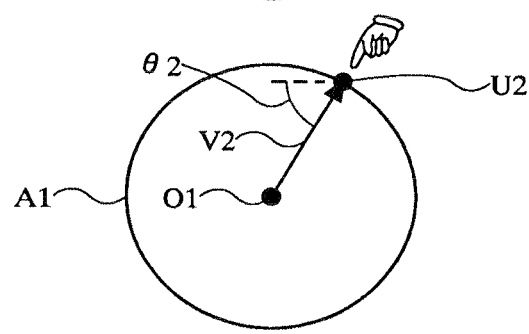
F I G. 1 0 C
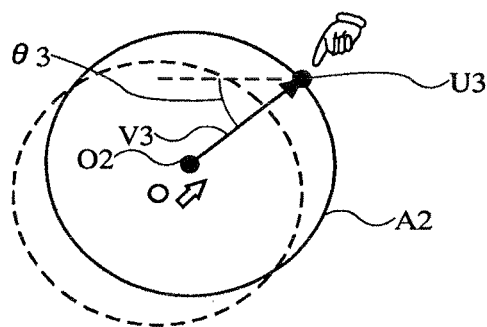
F I G. 1 0 D
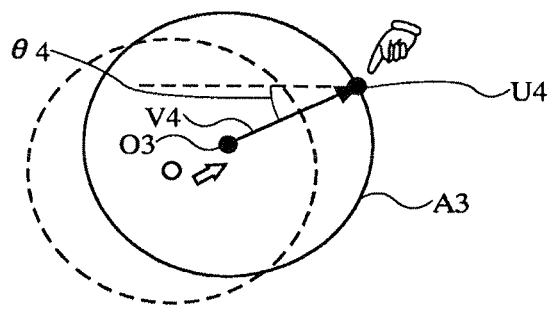

F I G. 1 2
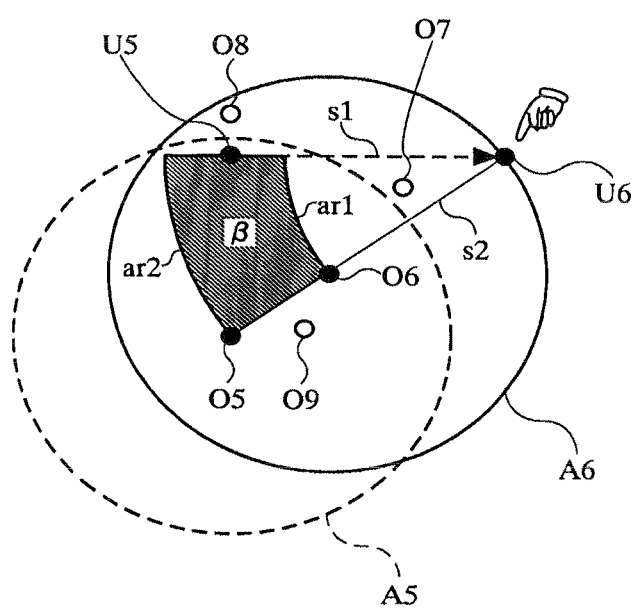

STORAGE MEDIUM HAVING GAME PROGRAM STORED THEREON, GAME APPARATUS AND INPUT DEVICE

CROSS-REFERENCE

This application is a continuation of U.S. application Ser. No. 11/159,342, filed Jun. 23, 2005, which claims priority of Japanese patent Application No. 2004-257370, filed Sep. 3, 2004, the entire contents of each of which are hereby incorporated by reference in this application.

BACKGROUND AND SUMMARY

Technical Field

The present invention relates to a storage medium having a game program stored thereon, a game apparatus and an input device, and more particularly to a storage medium in which stored is a game program used for a computer game for which a pointing device such as a touch panel is employed, a game apparatus and an input device.

Description of the Background Art

Conventionally, various types of games for which a joystick is used as a controller have been developed. The joystick is provided with a lever, and a player tilts the lever forward and backward, and rightward and leftward, thereby making inputs according to the directions. In general, a direction in which and a degree to which the joystick is tilted are handled by a game apparatus as an input direction and an input quantity, respectively. In a case where the player tilts the joystick lever in a certain direction to a certain degree to hold the joystick lever at that position, the positional information is continuously outputted and handled by the game apparatus as the input direction and the input quantity. The joystick is also used for a typical personal computer as well as used as a controller for a home game apparatus.

On the other hand, an input device which is operated by a player using a touch panel has been also developed, as disclosed in, for example, Japanese Laid-Open Patent Publication No. 11-53115 (Document 1) and Japanese Laid-Open Patent Publication No. 7-182092 (Document 2) With the input device disclosed in the Document 1, as shown in FIG. 1 and FIG. 3 of the Document 1, a player uses a touch panel to utilize, as a direction in which and a speed at which a cursor moves, a direction and a distance from a predetermined origin on the touch panel to a point at which the player is pointing. On the other hand, in the input device disclosed in the Document 2, as shown in FIG. 6 of the Document 2, a game screen is displayed on a display having a touch panel mounted thereon. According to a movement corresponding to a vector quantity of a movement of a finger with which a player touches the touch panel, an object which is selectively touched is moved on the game screen.

Here, if an operation in which a joystick is emulated can be realized for a game apparatus having a touch panel, it is convenient. In this case, information which is eventually required is a vector value of two axes of X and Y corresponding to a joystick input value. The vector value is represented as a vector value (sx, sy) in a stick coordinate system. A direction indicated by the vector value (sx, sy) is a direction in which the joystick is tilted and a length of the vector value is a degree to which the joystick is tilted. Further, the length of the vector value corresponding to the joystick being tilted to the maximum is set as "1". In this case, sx=−1 to +1 and sy=−1 to +1, and the length of "0" indicates that the joystick is in a neutral (upright) position.

Further, the vector value (sx, sy) in the stick coordinate system can be obtained according to the following formula, using an origin (ox, oy) on the touch panel and a point (tx, ty) at which the player is pressing the touch panel, the origin and the point being represented in the touch panel coordinate system.

$sx=(tx-ox) \times \text{ratio}$ $sy=(ty-oy) \times \text{ratio}$ where the ratio is a conversion ratio used for defining a length in the touch panel coordinate system, which corresponds to the length "1" in the stick coordinate system. For example, when a length from an origin is "10" in the touch panel coordinate system, the length is defined as "1" in the stick coordinate system. Consequently, the ratio is set as "ratio=1÷10=0.1".

While the invention disclosed in the Document 1 utilizes, for information processing, a difference between an origin and a point at which a touch panel is being pressed, when the input method of the invention disclosed in the Document 1 is applied as it is to the operation in which a joystick is emulated, various problems arise.

In the case of an actual joystick, the player keeps the lever tilted at a desired angle in a desired direction, thereby continuously outputting an input value according to the direction and the angle. That is, the joystick continuously supplies a constant output when the lever is held at a predetermined position. In a case where such operation is applied to the invention disclosed in the Document 1, an angle and a distance between an center point (origin) being set at the center of the touch panel and an input point at which the player presses the touch panel are used as an input value for the operation in which a joystick is emulated. Therefore, since the origin used for the operation in which a joystick is emulated is fixedly set as the center point of the touch panel, when the player touch-operates the touch panel, the player must constantly confirm the position of the origin being set on the touch panel so as to perform a correct operation. In the case of an actual joystick, since the player can perceive how the lever is being tilted with his finger or hand, the player does not have to visually confirm the origin of the joystick. However, in a case where an operation in which a joystick is emulated using a touch panel is realized, since the player cannot perceive the origin with his finger, the player must visually confirm the position of the origin.

A method for relatively moving a cursor according to a movement trace of a player's finger is also disclosed in the Document 1. Further, a method for moving an object which is selectively touched on a game screen according to a movement corresponding to a vector of a movement of a finger with which a player touches a touch panel is disclosed in the Document 2. In these methods, however, since the input is not made until the players' finger moves, the input for which a joystick is emulated cannot be realized. This is because an actual joystick continuously supplies a constant input when a lever is held at a predetermined position as described above. More specifically, in a case where a game object is moved according to a movement corresponding to a vector of a movement of a finger which touches the touch panel in the method disclosed in the Document 2, the finger must be continuously moved in order to move the game object.

Therefore, an object of the present invention is to provide a storage medium having stored thereon a game program for preventing, in an operation in which a joystick is emulated using a pointing device, a player from being confused during the operation, a game apparatus, and an input device.

The present invention has the following features to attain the object mentioned above. The reference numerals, step Nos. (a step is abbreviated as S and only the step Nos. are indicated), and the like in the parentheses indicate the correspondence with the embodiment described below in order to aid in understanding the present invention and are not intended to limit, in any way, the scope of the present invention.

A first aspect of the present invention is directed to a storage medium having stored thereon a game program executed by a computer (21) in a game apparatus (1) which is operated using a pointing device (13). The pointing device outputs coordinate information (tx, ty) being based on a given coordinate system (touch panel coordinate system) and being designated according to an operation of a player. The game program stored on the storage medium causes the computer operable to execute a reference coordinate setting step (S43), a designated coordinate setting step (S44), and a game control step (S48, S52, and S53). In the reference coordinate setting step, reference coordinates (ox, oy) for controlling the game in the coordinate system is set based on coordinate information which is outputted when a state that no coordinate information is outputted from the pointing device is shifted to a state that coordinate information is outputted. In the designated coordinate setting step, designated coordinates (ux, uy) in the coordinate system is set based on the coordinate information which is outputted from the pointing device. In the game control step, the game is controlled based on at least one (sx, sy) of an input direction which is a direction from the reference coordinates to the designated coordinates and an input distance which is a distance between the reference coordinates and the designated coordinates. The pointing device is an input device for designating an input position or coordinates on a screen, such as a touch panel, a mouse, a track pad, and a track ball. The coordinate system used for each input device is a touch panel coordinate system or a screen coordinate system.

In a second aspect based on the first aspect, in the reference coordinate setting step, when the player carries out a continuous operation using the pointing device, the reference coordinates are set in the coordinate system based on the earliest coordinate information which is designated by the player.

In a third aspect based on the first aspect, the game program stored on the storage medium further causes the computer operable to execute an output detection step (S40, S42, and S49 to S51). In the output detection step, it is detected that a state that the player is operating the pointing device is shifted to a non-operation state (S50) according to whether coordinate information is outputted from the pointing device or not (S40). In the reference coordinate setting step, the reference coordinates are reset in the coordinate system based on coordinate information which is outputted when a state that no coordinate information is outputted from the pointing device is shifted again to a state that the coordinate information is outputted (Yes in both S40 and S42) after the non-operation state is detected in the output detection step (a touch flag is set as OFF in S51).

In a fourth aspect based on the third aspect, in the output detection step, when the state that the coordinate information is outputted from the pointing device is shifted to the state that no coordinate information is outputted, counting a time period during which the non-output state is continued is started (S49), and when the time period being counted exceeds a predetermined time period (Yes in S50), it is determined that a state that the player is operating the pointing device is shifted to a non-operation state (S51).

In a fifth aspect based on the first aspect, in the game control step, when an output of coordinate information from the pointing device is stopped, the game is continuously controlled based on at least one of the input direction and the input distance between the designated coordinates and the reference coordinates which are set before the output is stopped.

In a sixth aspect based on the first aspect, the game program stored on the storage medium further causes the computer operable to execute a positional relationship storage step. In the positional relationship storage step, when the output of coordinate information from the pointing device is stopped, stored is a relative positional relationship between the designated coordinates and the reference coordinates, which are set before the output is stopped. In the designated coordinate setting step, a position indicated by the earliest coordinate information which is outputted from the pointing device after the output is stopped is set as the designated coordinates in the coordinate system. In the reference coordinate setting step, the reference coordinates are reset in the coordinate system based on the relative positional relationship having been stored in the positional relationship storage step using as a reference the position indicated by the earliest coordinate information.

In a seventh aspect based on the first aspect, the game apparatus comprises a display (12) which is covered by the pointing device. The game program stored on the storage medium further causes the computer operable to execute a reference coordinate position display step. In the reference coordinate position display step, an image indicating the position of the reference coordinates is displayed on the display.

An eighth aspect of the present invention is directed to a game apparatus which is operated using a pointing device. The pointing device outputs coordinate information being based on a given coordinate system and being designated according to an operation of a player. The game apparatus comprises a reference coordinate setting means, a designated coordinate setting means and a game control means. The reference coordinate setting means sets reference coordinates for controlling the game in the coordinate system, based on the coordinate information which is outputted when a state that no coordinate information is outputted from the pointing device is shifted to a state that coordinate information is outputted. The designated coordinate setting means sets designated coordinates in the coordinate system based on the coordinate information which is outputted from the pointing device. The game control means controls the game based on at least one of an input direction which is a direction from the reference coordinates to the designated coordinates and an input distance which is a distance between the reference coordinates and the designated coordinates.

A ninth aspect of the present invention is directed to an input device for inputting information to the game apparatus according to an operation of a player. The input device comprises a coordinate information output means (13), a reference coordinate setting means, and a designated coordinate setting means. The coordinate information output means outputs coordinate information being based on a given coordinate system and being designated according to the operation of the player. The reference coordinate setting means sets reference coordinates for controlling the game in the coordinate system, based on coordinate information which is outputted when a state that no coordinate information is outputted from the coordinate information output means is shifted to a state that the coordinate information is outputted. The designated coordinate setting means sets designated coordinates in the coordinate system based on the coordinate information which is outputted from the coordinate information output means. The game apparatus controls the game based on at least one of an input direction which is a direction from the reference coordinates to the designated coordinates and an input distance which is a distance between the reference coordinates and the designated coordinates.

A tenth aspect of the present invention is directed to a storage medium having stored thereon a program executed by a computer in an information processing apparatus (1) which is operated using a pointing device. The pointing device outputs coordinate information being based on a given coordinate system and being designated according to an operation of a user. The program stored on the storage medium causes the computer operable to execute a reference coordinate setting step, a designated coordinate setting step, and an operation processing step. In the reference coordinate setting step, reference coordinates for performing operation processing in the coordinate system is set based on the coordinate information which is outputted when a state that no coordinate information is outputted from the pointing device is shifted to a state that the coordinate information is outputted. In the designated coordinate setting step, designated coordinates in the coordinate system is set based on the coordinate information which is outputted from the pointing device. In the operation processing step, operation processing is performed based on at least one of an input direction which is a direction from the reference coordinates to the designated coordinates and an input distance which is a distance between the reference coordinates and the designated coordinates.

According to the first aspect, when an operation in which a joystick is emulated is carried out with using reference coordinates and designated coordinates which are set by a pointing device, the reference coordinates which are fixedly set through a continuous operation is set based on coordinate information which is outputted when a state that no coordinate information is outputted from the pointing device is shifted to a state that the coordinate information is outputted. Therefore, the player operates the pointing device by himself, and thereby the player can controllably feel and know the position of the reference coordinates having been set by himself. That is, the player can recognize the reference coordinates as if he controls a joystick, and thereby it is unnecessary to visually confirm the position of the reference coordinates. Further, reference coordinates which are always fixed with respect to the pointing device is not set, and thereby the operation can be started at any position in the coordinate system for the pointing device.

According to the second aspect, the reference coordinates are set based on the earliest coordinate information which is designated during a continuous operation carried out by the player using the pointing device, and thereby the player can easily and controllably set the reference coordinates during the operation and naturally know the position of the reference coordinates.

According to the third aspect, the player can easily reset the reference coordinates.

According to the fourth aspect, even when the operation on the pointing device is interrupted against the player's intention, the player can continue the game feeling as if no interruption has occurred.

According to the fifth aspect, the player does not have to continue the same operation for a long time, and thereby the same operation can be easily continued.

According to the sixth aspect, since a relative positional relationship between the reference coordinates and the designated coordinates is maintained, even when the operation is interrupted against the player's intention, the player can continue the game feeling as if no interruption has occurred.

According to the seventh aspect, an image indicating the position of the reference coordinates is displayed on a display, and thereby the reference position can be further displayed to the player in real time.

Moreover, the game apparatus, the input device and the storage medium having a program stored thereon according to the present invention enables the same effect as that obtained by the aforementioned game program to be achieved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a subroutine which is a detailed operation of initialization at the start of touch in step 43 shown in FIG. 3;

FIGS. 10A to 10D are diagrams illustrating an example where the vector value from the origin to the designated point is changed by repeating the origin drawing on the basis of the flow chart shown in FIG. 3;

FIG. 12 is a diagram illustrating another example for explaining a position to which the origin is drawn according to the parameters m and n.

DESCRIPTION OF THE PREFERRED EMBODIMENTS

Figure 1:
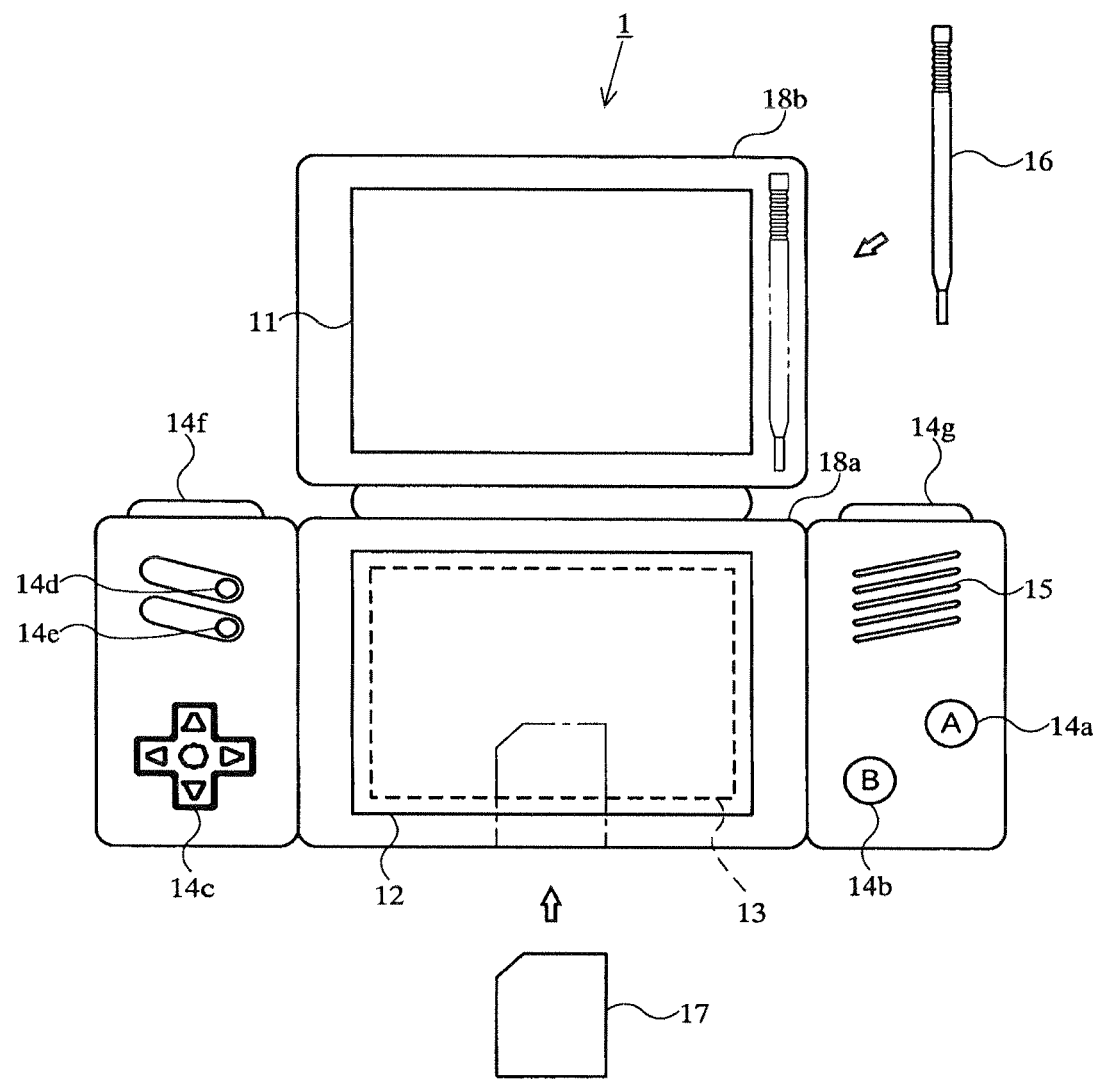
FIG. 1 is an outline view illustrating a game apparatus 1 executing a game program according to one embodiment of the present invention.

A game apparatus which executes a game program according to one embodiment of the present invention will be described with reference to the drawings. FIG. 1 is an outline view illustrating a game apparatus 1 which executes a game program according to the present invention. Here, a portable game apparatus is shown as an example of the game apparatus 1.

In FIG. 1, the game apparatus 1 according to this embodiment is accommodated in a housing 18 so that two liquid crystal display devices (hereinafter, referred to as "LCDs") 11 and 12 are placed in predetermined positions. Specifically, in a case where the first LCD 11 and the second LCD 12 are to be positioned one on top of the other, the housing 18 is composed of a lower housing 18a and an upper housing 18b, the upper housing 18b being pivotably supported by a portion of the upper side of the lower housing 18a. The upper housing 18b has a planar contour which is slightly larger than that of the first LCD 11. The upper housing 18b has an opening in one principal face thereof, through which a display screen of the first LCD 11 is exposed. The lower housing 18a has a more elongated planar contour than that of the upper housing 18b (i.e., so as to have a longer lateral dimension). An opening for exposing the display screen of the second LCD 12 is formed in a portion of the lower housing 18a which lies substantially in the center of the lower housing 18a along the lateral direction. A sound hole for the loudspeaker 15 is formed in either (right or left) wings of the lower housing 18a between which the second LCD 12 is interposed. An operation switch section 14 is provided on the right and left wings of the lower housing 18a between which the second LCD 12 is interposed.

The operation switch section 14 includes: an operation switch ("A" button) 14a and an operation switch ("B" button) 14b, which are provided on a principal face of the right wing of the lower housing 18a (lying to the right of the second LCD 12); a direction switch (cross key) 14c, a start switch 14d, and a select switch 14e, which are provided on a principal face of the left wing of the lower housing 18a (lying to the left of the second LCD 12); and side switches 14f and 14g. The operation switches 14a and 14b are used for giving instructions such as: "pass" "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG. The direction switch 14c is used by a player for providing instructions concerning directions on the game screen, e.g., instructions of moving directions of (i.e., a direction in which to move) a player object (or a player character) that can be controlled by using the operation switch section 14, or instructions of a moving direction for a cursor, for example. The side switch ("L" button) 14f and the side switch ("R" button) 14g are provided at the left and right ends of an upper face (upper side face) of the lower housing 18a. As necessary, more operation switches may be added.

Further, a touch panel 13 (an area marked by dotted lines in FIG. 1) is mounted on the upper principal face of the second LCD 12 as an example of the input device of the present invention. The touch panel 13 may be of any one of, for example, a resistive film type, an optical type (infrared type), or a capacitive coupling type. The touch panel 13 is a pointing device which, when a stylus 16 (or a finger) is pressed against or moved or dragged on the upper principal face of the touch panel 13, detects the coordinate position of the stylus 16 and outputs coordinate data.

As necessary, a hole (an area marked by double-dot lines in FIG. 1) accommodating the stylus 16 with which to manipulate the touch panel 13 is provided near a side face of the upper housing 18b. The hole can hold the stylus 16. In a portion of a side face of the lower housing 18a is provided a cartridge receptacle (an area marked by dash-dot lines in FIG. 1), into which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18a (or alternatively the upper housing 18b) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Figure 2:
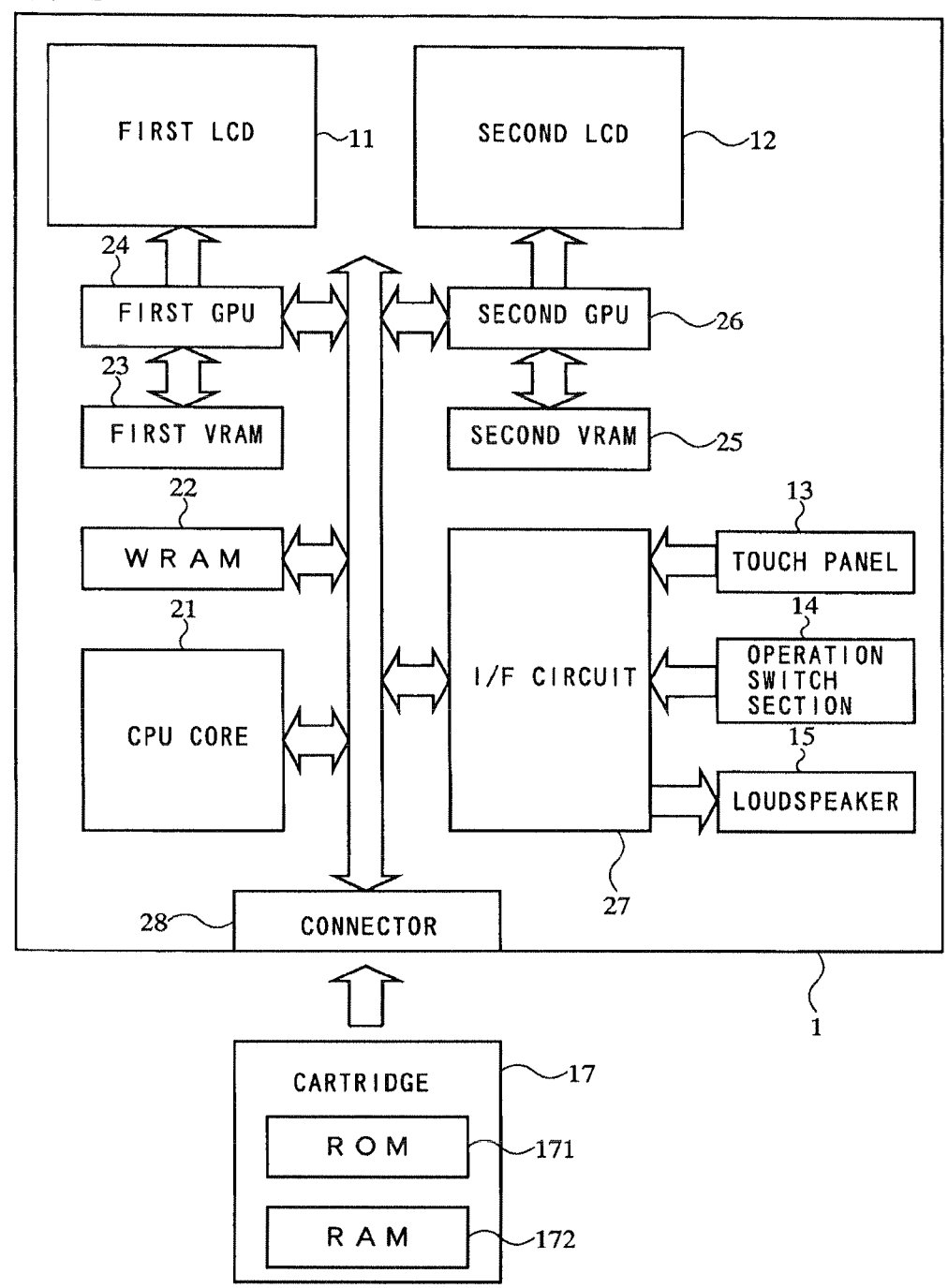
FIG. 2 is a block diagram illustrating an internal structure of the game apparatus 1 shown in FIG. 1.

Next, referring to FIG. 2, the internal structure of the game apparatus 1 will be described. FIG. 2 is a block diagram illustrating an internal structure of the game apparatus 1 of FIG. 1.

In FIG. 2, a CPU core 21 is mounted on the electronic circuit board accommodated in the housing 18. Via a predetermined bus, the CPU core 21 is connected to a connector 28 for enabling connection with the cartridge 17, an input/output interface (I/F) circuit 27, a first graphics processing unit (first GPU) 24, a second graphics processing unit (second GPU) 26, and a working RAM (WRAM) 22.

The cartridge 17 is detachably connected to the connector 28. As described above, the cartridge 17 is a storage medium for storing a game program. Specifically, the cartridge 17 includes a ROM 171 for storing a game program and a RAM 172 for storing backup data in a rewritable manner. A game program which is stored in the ROM 171 of the cartridge 17 is loaded to a WRAM 22, and the game program having been loaded to the WRAM 22 is executed by the CPU core 21. Temporary data which is obtained by the CPU core 21 executing the game program and data from which to generate images are stored in the WRAM 22.

Thus, the ROM 171 has stored thereon a game program which comprises instructions and data which are of a format executable by a computer in the game apparatus 1, in particular by the CPU core 21. The game program is loaded to the WRAM 22 as appropriate, and executed. Although the present embodiment illustrates an example where the game program and the like are stored on the cartridge 17, the game program and the like may be supplied via any other medium or via a communications circuit.

The touch panel 13, the operation switch section 14, and the loudspeaker 15 are connected to the I/F circuit 27. The loudspeaker 15 is placed inside the aforementioned sound hole.

The first GPU 24 is connected to a first video-RAM (hereinafter "VRAM") 23. The second GPU 26 is connected to a second video-RAM (hereinafter "VRAM") 25. In accordance with an instruction from the CPU core 21, the first GPU 24 generates a first game image on the basis of the data used for generation of image which is stored in the WRAM 22, and writes images into the first VRAM 23. In accordance with an instruction from the CPU core 21, the second GPU 26 generates a second game image on the basis of the data used for generation of image which is stored in the WRAM 22, and writes images into the second VRAM 25.

The first GPU 24 is connected to the first LCD 11, and the second GPU 26 is connected to the second LCD 12. The first GPU 24 outputs to the first LCD 11 the first game image which has been written into the first VRAM 23 in accordance with an instruction from the CPU core 21, and the first LCD 11 displays the first game image having been output from the first GPU 24. The second GPU 26 outputs to the second LCD 12 the second game image which has been written into the second VRAM 25 in accordance with an instruction from the CPU core 21, and the second LCD 12 displays the second game image having been output from the second GPU 26.

The I/F circuit 27 is a circuit which governs exchanges of data between the CPU core 21 and the external input/output devices such as the touch panel 13, the operation switch section 14, and the loudspeaker 15. The touch panel 13 (including a device driver for the touch panel) has a touch panel coordinate system corresponding to the coordinate system of the second VRAM 25, and outputs data of position coordinates corresponding to a position which is input (designated) by means of the stylus 16 or the like. For example, the display screen of the second LCD 12 has a resolution of 256 dots×192 dots, and the touch panel 13 also has a detection accuracy of 256 dots×192 dots so as to correspond to the display screen. The detection accuracy of the touch panel 13 may be lower or higher than the resolution of the display screen of the second LCD 12.

Figure 3:
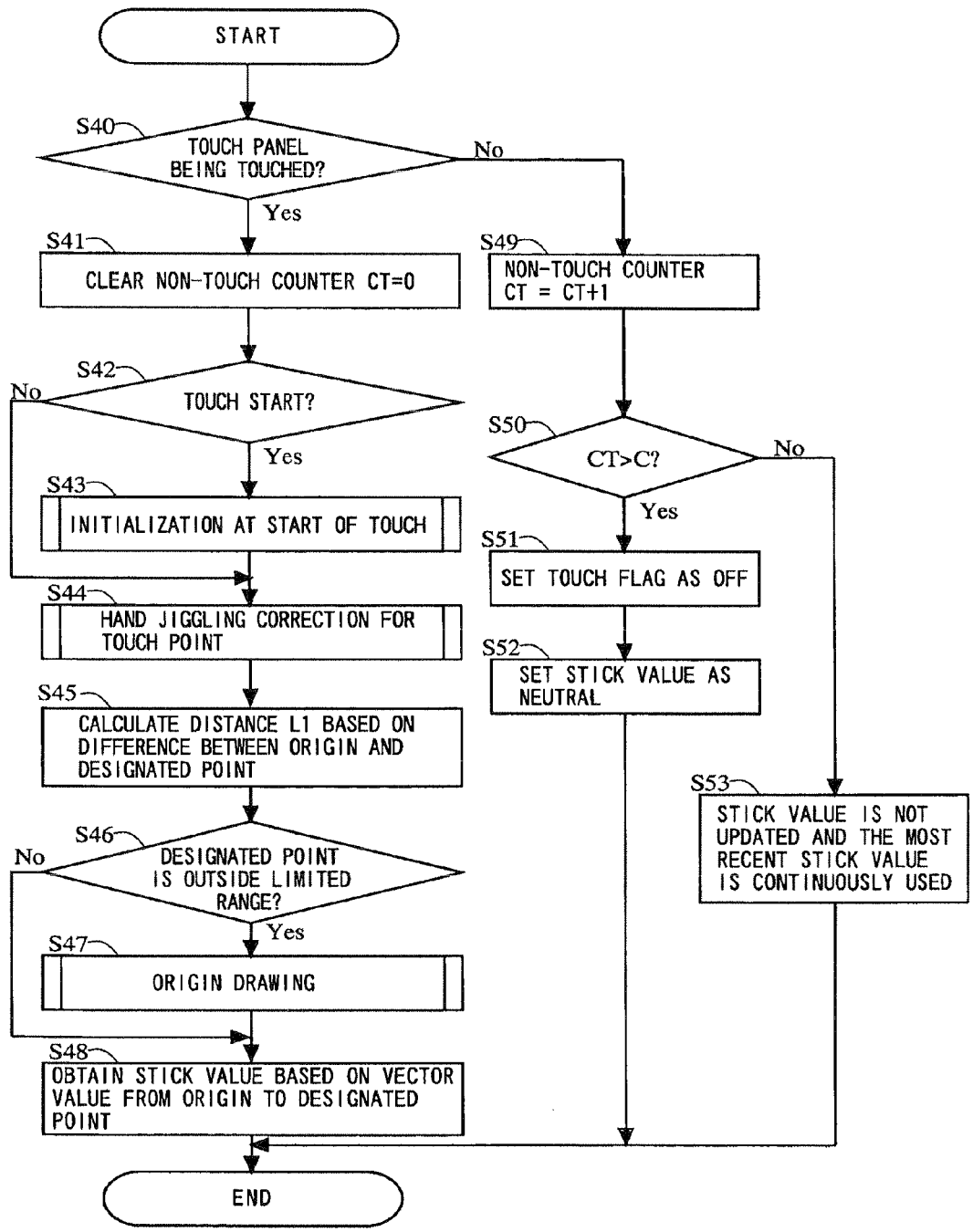
FIG. 3 is a flow chart illustrating an operation performed by the game apparatus 1 by executing the game program according to one embodiment of the present invention.
Figure 5:
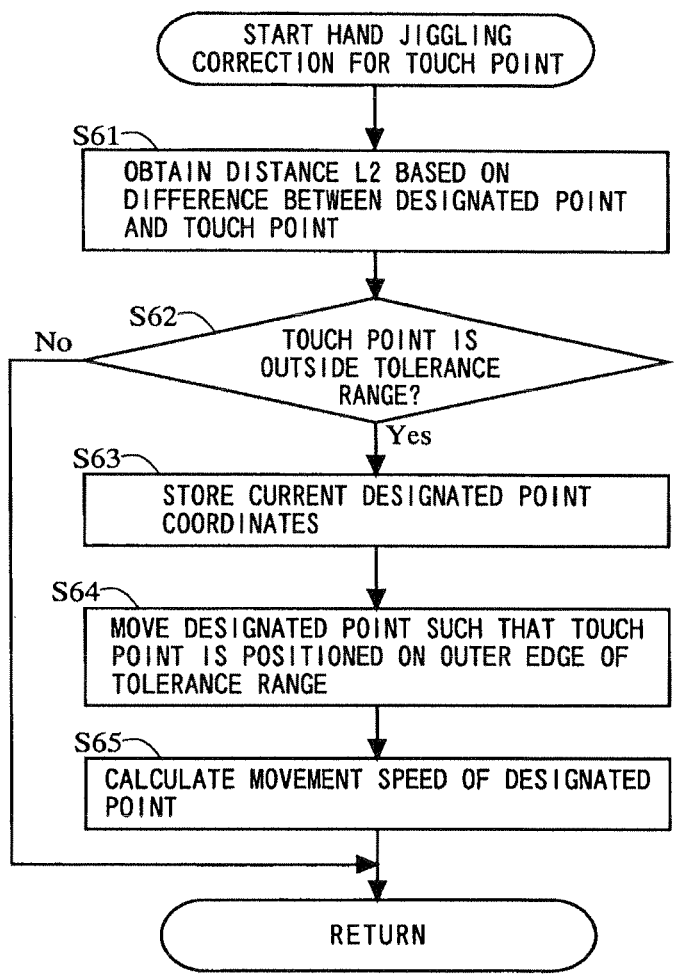
FIG. 5 shows a subroutine which is a detailed operation of hand jiggling correction for the touch point in step 44 shown in FIG. 3.
Figure 6:
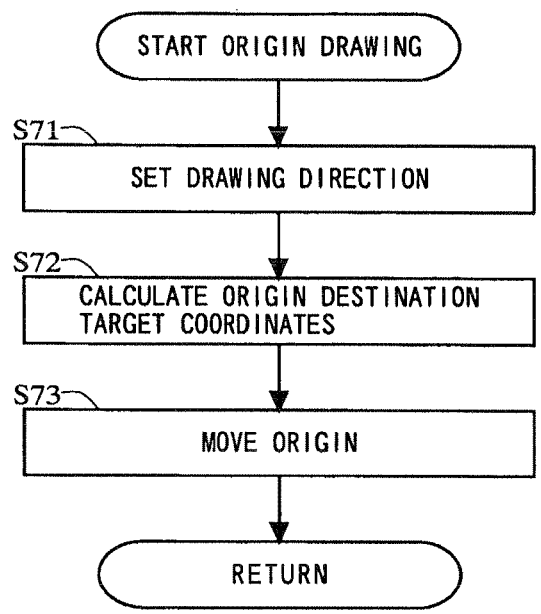
FIG. 6 shows a subroutine which is a detailed operation of an origin being drawn in step 47 shown in FIG. 3.

Next, processing which is executed by the game apparatus 1 according to the game program on the basis of information inputted from the touch panel 13 according to the present invention will be described with reference to FIGS. 3 to 11. FIG. 3 is a flow chart illustrating an operation which is carried out by the game apparatus 1 by executing the game program. FIG. 4 shows a subroutine illustrating an operation of initialization at the start of touch in step 43 of FIG. 3 in detail. FIG. 5 shows a subroutine illustrating an operation of hand jiggling correction for a touch point in step 44 of FIG. 3 in detail. FIG. 6 shows a subroutine illustrating an operation of an origin being drawn in step 47 of FIG. 3 in detail. FIGS. 7A to 11 are diagrams illustrating examples of touch-operations which are processed through the operation based on the flow chart shown in FIG. 3. The program for executing these processing is contained in the game program stored in the ROM 171. When the game apparatus 1 is powered on, the program is loaded to the WRAM 22 from the ROM 171, and executed by the CPU core 21.

Initially, when the power source (not shown) of the game apparatus 1 is turned on, the CPU core 21 executes a boot program (not shown), and thereby the game program stored in the cartridge 17 is loaded to the WRAM 22. The game program having been loaded is executed by the CPU core 21, thereby to execute steps (abbreviated as "S" in FIGS. 3 to 6) shown in FIG. 3. The game program is executed, and thereby game images and the like in accordance with the game program are written into the first LCD 11 and the second LCD 12. The detailed description is not given of the contents of the game. Here, the processing based on the information inputted from the touch panel 13 will be described in detail.

In FIG. 3, the CPU core 21 determines whether a player is touching the touch panel 13 or not in step 40. The touch panel 13 has a touch panel coordinate system as described above, and outputs data of position coordinates corresponding to a position which is inputted (designated) by means of the stylus 16 or a finger of the player. That is, in step 40, the CPU core 21 detects whether the data of the position coordinates outputted by the touch panel 13 (including a device driver controlling the touch panel 13) is present or not. When the player is touching the touch panel 13, the CPU core 21 advances the processing to the next step 41. On the other hand, when the player is not touching the touch panel 13, the CPU core 21 advances the processing to the next step 49.

In step 41, the CPU core 21 clears a non-touch counter CT to "0". The non-touch counter CT is a counter with which the CPU core 21 determines whether or not the player intentionally puts the touch panel 13 in a non-touch state. As is apparent from the below description, when no coordinate information is outputted from touch panel 13, the CPU core 21 starts counting by means of the non-touch counter CT.

Next, the CPU core 21 determines whether or not the player touch-operates the touch panel 13 as a start of touch (that is, determines whether a non-touch state changes to a touch state or not, and more specifically, determines whether or not a state that no coordinate information is outputted from the touch panel 13 is shifted to a state that coordinate information is outputted.) The CPU core 21 can determine whether the touch-operation is a start of touch or not based on whether the touch flag is being set as ON or OFF, which will be described later. When the touch-operation is a start of touch (that is, when the touch flag is being set as OFF), the CPU core 21 advances the processing to the next step 43. On the other hand, when the touch-operation is not a start of touch (that is, when the touch-operation is continued; the touch flag is being set as ON), the CPU core 21 advances the processing to the next step 44.

In step 43, the CPU core 21 carries out initialization at the start of touch. Hereinafter, the initialization at the start of touch will be described with reference to a subroutine shown in FIG. 4.

In FIG. 4, the CPU core 21 sets the touch flag as ON in step 55. The CPU core 21 sets, to an origin (reference coordinates) on the touch panel 13, a touch point at which the player is currently touch-operating the touch panel 13 (hereinafter, simply referred to as a touch point) and stores the touch point in step 56. Specifically, when the touch point is (tx, ty) and the origin is (ox, oy) in the touch panel coordinate system, the CPU core 21 sets, as the origin coordinates, $$ox=tx$$

$$oy=ty.$$

That is, when a state that no coordinate information is outputted from the touch panel 13 is shifted to a state that coordinate information is outputted, the CPU core 21 sets origin coordinates (reference coordinates) on the touch panel 13 based on the earliest coordinate information of a touch point, which is outputted from the touch panel 13.

Next, the CPU core 21 sets the touch point as a designated point on the touch panel 13 (hereinafter, simply referred to as a designated point) in step 57, and ends the processing according to the subroutine. Specifically, when the touch point is (tx, ty) and the designated point is (ux, uy) in the touch panel coordinate system, the CPU core 21 sets, as the designated point coordinates, $$ux=tx$$

$$uy=ty.$$

Returning to FIG. 3, in step 44, the CPU core 21 makes hand jiggling correction for a touch point. Hereinafter, the hand jiggling correction for a touch point will be described with reference to the subroutine shown in FIG. 5. For example, when a player touch-operates the touch panel 13 with his finger or the like which has a wide area, the touch panel 13 cannot determine the touch point as one point and the touch point coordinates sometimes jiggle. Therefore, in the hand jiggling correction for the touch point, the designated point coordinates for use in the processing are defined differently from the touch point coordinates to produce an tolerance for the touch point coordinates. That is, while the touch point coordinates are jiggling with respect to the designated point coordinates within a predetermined range, the designated point coordinates remains unchanged. For example, a circular frame (tolerance range) having the designated point coordinates at the center thereof is set, thereby setting the center of the circular frame as the designated point coordinates. While the touch point coordinates are present within the circular frame, the circular frame is not moved. On the other hand, when the touch point coordinates deviate beyond the circular frame, the circular frame is moved in accordance with the movement of the touch point, thereby resulting in the designated point coordinates being moved. That is, the designated point coordinates are moved in accordance with the movement of the circular frame, the movement being caused when the touch point contacts the outer edge of the circular frame. The radius of the circular frame corresponds to the tolerance range for the hand jiggling on the touch panel 13. The tolerance range is not necessarily required to be a circular area, and the designated point coordinates are not necessarily required to be the center of the area.

In FIG. 5, the CPU core 21 obtains a distance L2 between the touch point and the designated point which is currently being set based on the difference therebetween in step 61. Specifically, when the touch point is (tx, ty) and the designated point is (ux, uy) in the touch panel coordinate system, the CPU core 21 obtains the differences vx and vy as follows.

$$vx=ux-tx$$

$$vy=uy-ty$$

The CPU core 21 obtains the distance L2 as follows.

$$L2=\sqrt{vx^2+vy^2}$$

Thereby, the distance L2 between the designated point and the touch point are obtained on the basis of the touch panel coordinate system.

Figure 7A:
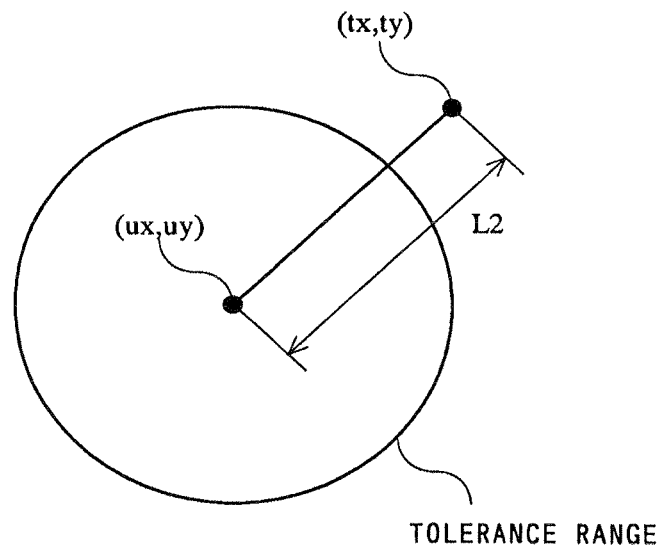
FIGS. 7A and 7B are diagrams illustrating an example of the hand jiggling correction, which is carried out according to the operation based on the flow chart shown in FIG. 3.

Next, the CPU core 21 determines whether or not the touch point deviates beyond the tolerance range which is set around the designated point in step 62. As shown in FIG. 7A, a predetermined area having the designated point (ux, uy) at the center thereof is set as the tolerance range. For example, the tolerance range is set as a circular area of a predetermined radius having the designated point (ux, uy) at the center thereof. The CPU core 21 compares the distance L2 obtained in the step 61 with the radius of the tolerance range, and when the distance L2 is larger, the CPU core 21 determines that the touch point deviates beyond the tolerance range. When the touch point deviates beyond the tolerance range (the state shown in FIG. 7A), the CPU core 21 advances the processing to the next step 63. On the other hand, when the touch point is within the tolerance range, the CPU core 21 ends the processing according to the subroutine.

Figure 7B:
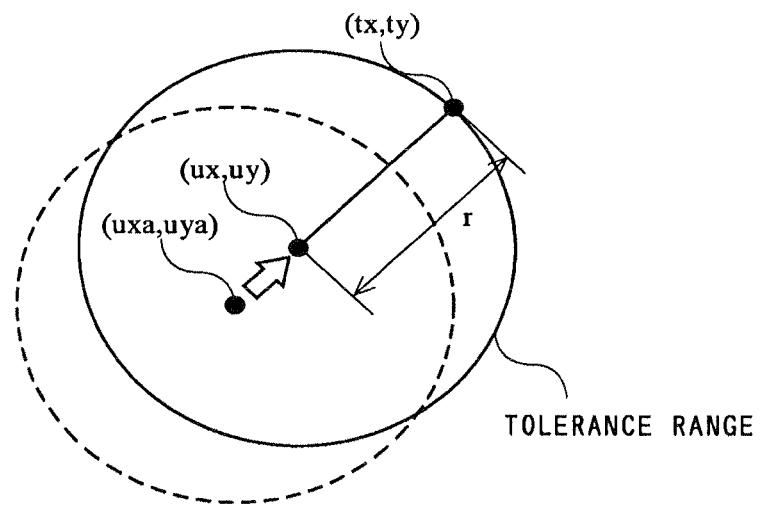

In step 63, the CPU core 21 stores the coordinates of the current designated point so as to obtain the movement speed of the designated point, which will be described later. Specifically, as shown in FIG. 7B, when the designated point coordinates to be stored are (uxa, uya) in the touch panel coordinate system, the CPU core 21 sets as $$uxa=ux$$

$$uya=uy.$$

Next, the CPU core 21 moves the designated point such that the touch point is positioned on the outer edge of the tolerance range in step 64. For example, as shown in FIG. 7B, the CPU core 21 moves the designated point along a straight line connecting the designated point with the touch point such that the distance between the designated point and the touch point is the distance r, thereby to set a new designated point. Specifically, when the new designated point is (ux, uy) in the touch panel coordinate system, the CPU core 21 sets as $$ux=tx+vx*r/L2$$

$$uy=ty+vy*r/L2$$

where r is a radius of the tolerance range.

Next, the CPU core 21 calculates the moving distance of the designated point in step 65, and ends the processing according to the subroutine. Specifically, the CPU core 21 calculates the moving distance of the designated point using the following formula.

$$uvx=ux-uxa$$

$$uvy=uy-uya$$

The motion vector (uvx, uvy) is used for adjusting a direction in which an origin is drawn, which will be described below in detail.

Returning to FIG. 3, the CPU core 21 obtains a distance L1 between the origin being currently set and the designated point based on the difference therebetween in step 45. Specifically, when the origin is (ox, oy) and the designated point is (ux, uy) in the touch panel coordinate system, the CPU core 21 obtains the differences vx and vy as follows:

$$vx=ox-ux$$

$$vy=oy-uy$$

The CPU core 21 obtains the distance L1 as follows.

$$L1=\sqrt{vx^2+vy^2}$$

Thereby, the distance L1 between the origin and the designated point are obtained on the basis of the touch panel coordinate system.

Figure 8:
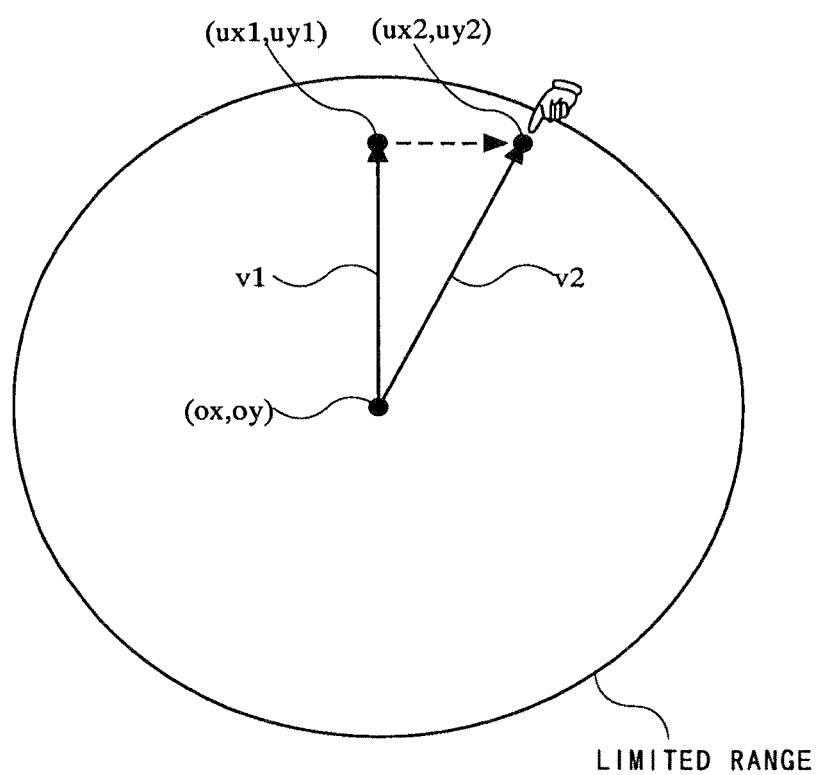
FIG. 8 is a diagram illustrating an example of a designated point, an origin, and a limited range which are processed according to the operation based on the flow chart shown in FIG. 3.

Next, the CPU core 21 determines whether or not the designated point deviates beyond the limited range being set around the origin in step 46. As shown in FIG. 8, a predetermined area having the origin (ox, oy) at the center thereof is set as the limited range. For example, the limited range is set as a circular area of a predetermined radius having the origin (ox, oy) at the center thereof. The CPU core 21 compares the distance L1 obtained in the step 45 with a radius R of the limited range, and when the distance L1 is larger, the CPU core 21 determines that the designated point deviates beyond the limited range. When the designated point deviates beyond the limited range, the CPU core 21 advances the processing to the next step 47. On the other hand, when the designated point is within the limited range (the state shown in FIG. 8), the CPU core 21 advances the processing to the next step 48.

Prior to step 47 being described, the processing of step 48 performed in the case of the designated point being within the limited range set around the origin (No in step 46) will be described. In step 48, the CPU core 21 obtains a stick value based on a vector value from the origin to the designated point.

According to the present embodiment, an operation in which the touch panel 13 is used to emulate a joystick is realized and the required information is a vector value of 2 axes of X and Y corresponding to an input value of a joystick (hereinafter, referred to as a stick value). The vector value is represented as a stick value (sx, sy) in the stick coordinate system. The direction indicated by the stick value (sx, sy) indicates a direction in which the joystick is tilted and the length of the stick value indicates a degree to which the joystick is tilted. Further, the length of the stick value corresponding to the joystick being tilted to the maximum is set as "1". In this case, sx=−1 to +1 and sy=−1 to +1. The length of "0" indicates that the joystick is in a neutral (upright) position.

In step 48, the stick value (sx, sy) in the stick coordinate system can be obtained according to the following formula, using the origin (ox, oy) and the designated point (ux, uy) on the touch panel 13, the origin and the designated point being represented in the touch panel coordinate system.

$$sx=(ux-ox)\times ratio$$

$$sy=(uy-oy)\times ratio$$

where the ratio is a conversion ratio used for defining a length in the touch panel coordinate system, which corresponds to the length "1" in the stick coordinate system. The vector value from the origin to the designated point is represented as a vector (ux-ox, uy-oy).

According to the present embodiment, a limited range corresponding to a frame for mechanically controlling a degree to which a joystick lever is tilted is provided around the origin, and an operation of the outer edge of the limited range being touch-operated is handled as an operation of the joystick being tilted to the maximum. A touch-operation performed outside the limited range is similarly handled as an operation of the outer edge of the limited range being touch-operated. That is, the length between the origin and the outer edge of the limited range provided around the origin is defined as the length "1" in the stick coordinate system. Accordingly, ratio=1/R is set. Here, R is a radius of the limited range in the touch panel coordinate system.

As shown in FIG. 8, the player touch-operates the touch panel 13 at a position vertically in front of the origin (ox, oy) in the limited range, thereby setting a designated point (ux1, uy1). In this case, the vector value from the origin to the designated point is a vector v1 (ux1-ox, uy1-oy) which is oriented vertically in front of the origin. The stick value obtained on the basis of the vector v1 has the direction to vertically in front of the origin and the length smaller than or equal to "1".

Then, the player touch-operates the touch panel 13 at a position to the right of the designated point (ux1, uy1) in the limited range, thereby setting a designated point (ux2, uy2). In this case, the vector value from the origin to the designated point is a vector v2 (ux2-ox, uy2-oy) which is oriented to the right forward direction. The stick value obtained on the basis of the vector v2 has the right forward direction and the length smaller than or equal to "1".

Returning to FIG. 3, when the designated point deviates beyond the limited range provided around the origin (Yes in step 46), the CPU core 21 performs an operation of the origin being drawn in step 47. Hereinafter, an operation of the origin being drawn will be described with reference to the subroutine shown in FIG. 6.

In FIG. 6, the CPU core 21 sets a direction in which the origin is drawn in step 71. For example, the CPU core 21 sets a direction in which the origin is drawn to a drawing direction (px, py) in the touch panel coordinate system. The CPU core 21 obtains the drawing direction (px, py) as follows.

$$px=ox-(ux+uvx*m)$$

$$py=oy-(uy+uvy*m)$$

where m is a parameter greater than or equal to 0, for adjusting a direction in which the origin is drawn, and the greater the value is, the closer is the direction in which the origin is drawn to the moving direction of the designated point, that is, the closer is the origin to the backward position of the designated point (assuming that the moving direction of the designated point is forward). That is, in the case of m=0, the origin is drawn so as not to change the direction of the vector connecting the origin with the designated point. The origin is drawn such that the greater m is, the closer is the direction of the vector oriented from the origin to the designated point to the direction of the motion vector of the designated point. According to the adjustment of the value of m, the vector direction of the stick value is determined by focusing on the positional relationship between the designated point and the origin (when m is small), or the vector direction of the stick value is determined by focusing on the moving direction of the designated point (when m is large). While the expression of "drawing direction" is used, it should be noted that the "drawing direction" is calculated as a reverse direction of the direction in which the origin is actually drawn. The origin drawing direction obtained using the parameter m will be described below in detail.

Figure 9A:
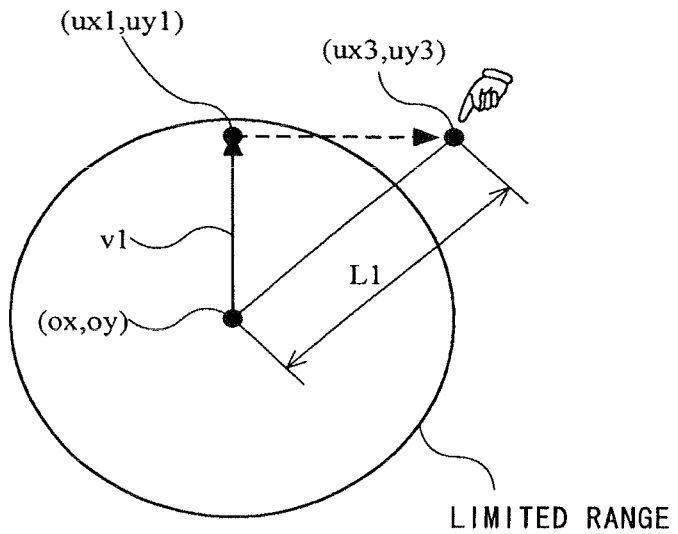
FIGS. 9A and 9B are diagrams illustrating an example of an operation of an origin being drawn, which is carried out according to the operation based on the flow chart shown in FIG. 3.

For example, as shown in FIG. 9A, the player touch-operates the touch panel 13 at a position vertically in front of the origin (ox, oy) in the limited range, thereby setting a designated point (ux1, uy1). In this case, since the designated point (ux1, uy1) is within the limited range, the operation of the origin being drawn is not executed. Then, the player touch-operates the touch panel 13 at a position which is to the right of the designated point (ux1, uy1) outside the limited range, thereby setting a designated point (ux3, uy3). In the step 71, in the case of m=0, the direction in which the origin (ox, oy) is connected with the designated point (ux3, uy3) is set as a direction (px, py) in which the origin is drawn.

Next, the CPU core 21 calculates origin destination target coordinates in step 72. Specifically, the CPU core 21 initially calculates a length L3 based on the drawing direction (px, py) which is set in step 71 as follows.

$$L3=\sqrt{px^2+py^2}$$

The CPU core 21 calculates the origin destination target coordinates (ox2, oy2) based on the touch panel coordinate system as follows.

$$ox2=ux+px*R/L3$$

$$oy2=uy+py*R/L3$$

Next, in step 73, the CPU core 21 moves the origin, updates origin coordinates, stores the updated origin coordinates, and ends the processing according to the subroutine. While the origin may be moved to the destination target coordinates which are determined as described above, the origin can be moved so as to gradually approach the destination target coordinates. Specifically, the CPU core 21 calculates the moved origin coordinates (ox, oy) as follows.

$$ox=ox+(ox2-ox)*n$$

$$oy=oy+(oy2-oy)*n$$

where n is a parameter indicating a rate at which the origin is moved so as to approach the destination target coordinates. The setting value of the parameter n can be adjusted so as to control a rate (parameter n) at which the pre-moved origin is added to a difference between the pre-moved origin and the destination target coordinates (ox2, oy2) calculated in step 72.

Figure 9B:
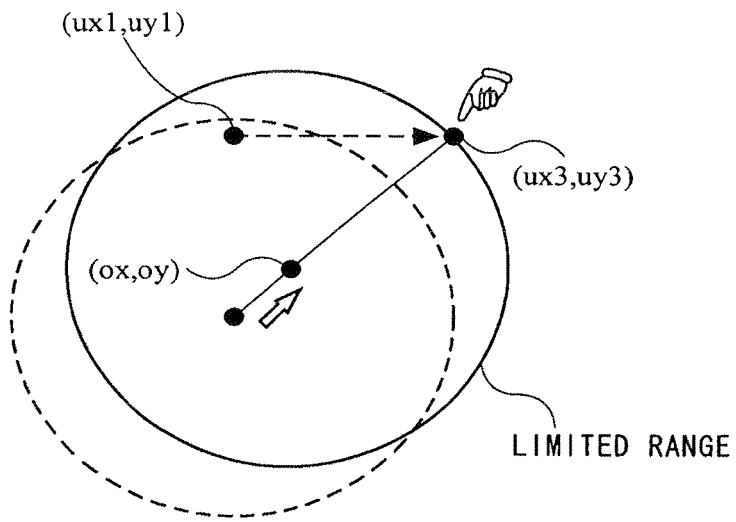

For example, FIG. 9B shows an example where the origin (ox, oy) is drawn to the designated point (ux3, uy3) in the case of the parameters m and n being set as m=0 and n=1, respectively. As shown in FIG. 9B, in a case where the designated point (ux3, uy3) is set outside the limited range (an area marked by the dotted lines in FIG. 9B), the origin (ox, oy) is drawn to the designated point (ux3, uy3) and the limited range is also drawn to the designated point (ux3, uy3). In the case of m=0, the direction in which the origin (ox, oy) is drawn is a direction in which the pre-moved origin moves to the designated point (ux3, uy3). In the case of n=1, the origin (ox, oy) is moved and thereby the designated point (ux3, uy3) is positioned at the outer edge of the limited range set around the origin, and the distance L1 between the origin having been moved and the designated point=the radius R of the limited range. As described above, when the designated point is outside the limited range, in the origin drawing operation, the origin is changed so as to approach the designated point.

Next, the processing of step 48 performed after the origin is drawn will be described. As described above, the CPU core 21 obtains a stick value based on a vector value from the origin to the designated point, and in step 48 the vector value is calculated using the origin having been drawn. Hereinafter, an example where the vector value is changed according to origins having been drawn will be described with reference to FIGS. 10A to 10D. FIGS. 10A to 10D are diagrams illustrating an example where the origin is repeatedly drawn, thereby changing the vector value from the origin to the designated point, and the parameters m and n are set as m=0 and n=1, respectively, for giving a concrete description.

In FIG. 10A, the player touch-operates the touch panel 13 at a position vertically in front of the origin O1 in the limited range A1, thereby setting a designated point U1. In this case, the vector value from the origin O1 to the designated point U1 is a vector V1 oriented vertically in front of the origin. The stick value which is obtained on the basis of the vector V1 also has a direction to vertically in front of the origin and has the length smaller than or equal to "1".

Then, the designated point is moved in the rightward direction. In FIG. 10B, the player touch-operates the touch panel 13 at the outer edge of the limited range A1 which is to the right of the designated point U1, thereby setting a designated point U2. In this case, the vector value from the origin O1 to the designated point U2 is a vector V2 indicating the right forward direction which forms an angle of θ2 with the horizontal direction. The stick value which is obtained on the basis of the vector V2 similarly has the right forward direction and the length of "1".

Further, the designated point is moved in the rightward direction. In FIG. 10C, the player touch-operates the touch panel 13 at a position which is to the right of the designated points U1 and U2 and which is outside the limited range A1 (an area marked by dotted lines in FIG. 10C), thereby setting a designated point U3. In the case of m=0, the origin (an outline round mark shown in FIG. 10C) is drawn in the direction of the designated point U3, and thereby the origin O2 is set so as to position the designated point U3 at the outer edge of the limited range A2. In this case, the vector value from the origin O2 to the designated point U3 is a vector V3 indicating the right forward direction which forms an angle of θ3 (θ3<θ2) with the horizontal direction. The stick value which is obtained on the basis of the vector V3 similarly has the right forward direction and the length of "1".

Moreover, in FIG. 10D, the player touch-operates the touch panel 13 at a position which is to the right of the designated points U1, U2 and U3 and which is outside the limited range A2 (an area marked by dotted lines in FIG. 10D), thereby setting a designated point U4. In the case of m=0, the origin (outline round mark shown in FIG. 10D) is drawn in the direction of the designated point U4, and thereby the origin O3 is set so as to position the designated point U4 at the outer edge of the limited range A3. In this case, the vector value from the origin O3 to the designated point U4 is a vector V4 indicating the right forward direction which forms an angle of θ4 (θ4<θ3) with the horizontal direction. The stick value which is obtained on the basis of the vector V4 similarly has the right forward direction and the length of "1".

As described above, the setting value of the parameter n is adjusted so as to control a rate at which the origin is moved so as to approach the destination target coordinates (that is, a rate at which a length indicated by a stick value is changed so as to approach a predetermined distance R when the length indicated by the stick value is larger than the predetermined distance R). Therefore, the distance between the origin and the designated point may be sometimes larger than R depending on a value of the parameter n. In this case, as to the stick value (sx, sy) obtained in the step 48, the absolute values of sx and sy are greater than 1, resulting in the length of the stick value being set as a value greater than 1. However, as described above, the length of the stick value indicates a degree to which a joystick is tilted and the length of the stick value corresponding to the joystick being tilted to the maximum is set as "1". Therefore, when the length of the stick value is greater than 1, the length of the stick value is set as "1".

As described above, in the origin drawing operation, when the designated point is continuously moved in a give direction (a direction in which the player moves the touch point; the right horizontal direction in FIGS. 10A to 10D), the direction indicated by the stick value (that is, the direction in which a joystick is tilted) gradually approaches the moving direction of the designated point (the right horizontal direction). Therefore, the player continuously moves the designated coordinates in a given direction, thereby determining a direction in which a stick is inputted without concern for the position of the origin.

Returning to FIG. 3, when the CPU core 21 determines that the player is not touching the touch panel 13 in the step 40, the CPU core 21 increments the non-touch counter CT by one in step 49. Next, the CPU core 21 determines whether or not the count value of the non-touch counter CT is greater than a predetermined value C in step 50. When the count value of the non-touch counter CT is greater than the predetermined value C, the CPU core 21 advances the processing to the next step 51. On the other hand, when the count value of the non-touch counter CT is smaller than or equal to the predetermined value C, the CPU core 21 advances the processing to the next step 53.

In step 51, the CPU core 21 sets the touch flag as OFF. The CPU core 21 sets the stick value as neutral in step 52, and ends the processing according to the flow chart. When the stick value is set as neutral, it indicates that a joystick is in a neutral (upright) position and sx=0 and sy=0.

On the other hand, in step 53, the CPU core 21 does not update the most recent stick value which has been obtained in the previous processing and continuously uses the same, and ends the processing according to the flow chart.

As is apparent from the processing of the steps 49 to 52, the CPU core 21 increments the count value of the non-touch counter CT in a case where the touch-operation performed on the touch panel 13 by the player is interrupted. In a case where the count value is greater than the predetermined value C, the CPU core 21 sets the touch flag as OFF and determines that the player stops the touch-operation. That is, when the count value of the non-touch counter CT is greater than the predetermined value C, the CPU core 21 determines that a state that the player is touch-operating the touch panel 13 is shifted to a non-touch operation state (that is, a state that the player intentionally stops the touch operation). Accordingly, even when the touch operation on the touch panel 13 is interrupted against the player's intention (for example, even when the player carelessly moves his finger off the touch panel), the player can continue the game feeling as if no interruption has occurred.

The stick value which is obtained in step 48, the stick value which is set in step 52, and the stick value which is continuously used in step 53 are used for game processing just like for a prior art game for which a joystick is used. For example, in a case where the player continues to touch-operate the same position on the touch panel 13 as a touch point (designated point), the processing according to the aforementioned flow chart is repeated in the processing cycle, thereby repeatedly obtaining the same stick value. That is, in the game processing performed by the game apparatus 1, the same stick value is used to repeat the game processing, and thereby the game processing similar to the processing according to the operation of a constant input being continuously supplied when a joystick lever is held at a predetermined position can be realized.

Also when the origin is fixed as in the prior art, a direction indicated by a stick value approaches the right horizontal direction in which the touch-operation is carried out. However, the angle κ4 and the like are smaller when the origin is fixed. It is clear that the direction indicated by the stick value further approaches the direction in which the touch-operation is carried out when the origin is drawn. Further, the designated point is always set within the limited range, and the distance between the designated point and the origin is always within a predetermined distance. Therefore, even when the player moves the designated point (touch point) to a position which is extremely far away from the origin and carries out an operation for tilting a joystick to the maximum and returning the joystick in the reverse direction, the distance to the origin of the touch panel is within the predetermined distance, thereby improving a response to the operation. Further, the origin is always set within a given range with respect to the touch point on the touch panel 13, and thereby the player can feel and know the position of the origin being set on the touch panel 13, and the player can control the touch panel 13 without visually checking the touch panel 13 feeling as if the player controls a joystick.

Figure 11:
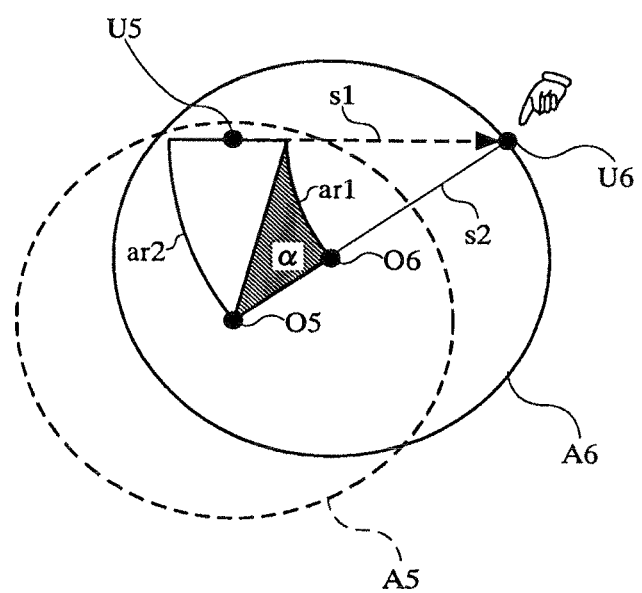
FIG. 11 is a diagram illustrating an example for explaining a position to which the origin is drawn according to parameters m and n.

As described above, the setting value of the parameter m can be adjusted so as to control a rate at which the destination target coordinates are moved so as to approach the backward position of the designated point (assuming that the moving direction of the designated point is forward) (that is, a rate at which a direction indicated by a stick value is moved so as to approach the moving direction of the designated point). Further, the setting value of the parameter n can be adjusted so as to control a rate at which the origin is moved so as to approach the destination target coordinates (that is, a rate at which a length indicated by a stick value is changed so as to approach a predetermined distance R when the length indicated by the stick value is larger than the predetermined distance R). Hereinafter, a relationship between the parameters m and n, and a position to which the origin is drawn will be described with reference to FIG. 11. FIG. 11 is a diagram for explaining a position of the origin which is drawn according to the parameters m and n.

In FIG. 11, the player touch-operates the touch panel 13 within a limited range A5 set around an origin O5, thereby setting a designated point U5. Then, the designated point is moved to the right, and the player touch-operates the touch panel 13 outside the limited range A5 on a straight line s1 in the rightward direction from the designated point U5, thereby setting a designated point U6. The origin is drawn according to the origin O5, the designated points U5 and U6 to position an origin O6 and set a limited range A6 based on the origin O6. FIG. 11 shows the origin O6 and the limited range A6 in the case of the parameter m=0 and the parameter n=1.

As described above, a direction in which the origin is drawn is adjusted according to the parameter m, and m≥0. The greater the setting value of the parameter m is, the closer the origin is drawn to the backward position of the designated point which moves from U5 to U6 along the straight line s1. In the case of m=0, a direction in which the origin O5 is connected with the designated point U6 (a straight line s2) is set as a direction in which the origin is drawn. Here, in order to draw the origin as close to the straight line s1 as possible, the calculation may be performed assuming that the designated point U6 is further moved along the direction of the straight line s1. Therefore, as described in the step 71, when a drawing direction (px, py) is obtained on the basis of the difference between the origin O5 and the designated point U6, a value which is obtained by multiplying a motion vector (uvx, uvy) of the designated point by a predetermined rate (parameter m) is added to the designated point coordinates so as to obtain a value which is obtained when the designated point U6 is further moved. Accordingly, the origin is drawn into a range which is interposed between the straight lines s1 and s2 according to the setting value of the parameter m, that is, the destination target coordinates are set in the range which is interposed between the straight lines s1 and s2. Further, as is apparent from the above-described formula, the destination target coordinates are set as a position which is a predetermined distance (R) apart from the designated point coordinates, thereby resulting in the destination target coordinates being determined as any point on an arc ar1 shown in FIG. 11. In the case of m=0, the destination target coordinates are set so as to be as close to an intersection of the straight line s2 and the arc ar1 as possible. In the case of m being infinitely great, the destination target coordinates are set on an intersection of the straight line s1 and the arc ar1. When m is greater than a predetermined value, the drawing direction may be set so as to match the drawing direction (px, py) with (uvx, uvy). Thereby, when m is greater than the predetermined value, the destination target coordinates can be set on an intersection of the straight line s2 and the arc ar1.

On the other hand, as described above, a rate at which the origin is drawn to the destination target coordinates can be adjusted according to the parameter n, and 0<n≤1. In the case of n=1, the origin is moved to the destination target coordinates. In the case of 0<n<1, the origin is moved to any point on a line segment by which the origin is connected with the destination target coordinates (exclusive of both ends). The point to which the origin is moved on the line segment depends on the value n. The smaller n is, the closer a selected point is to the current origin. The greater n is, the closer a selected point is to the destination target coordinates.

Accordingly, the setting values of parameters m and n are adjusted, thereby drawing (moving) the origin to a position within an area α shown in FIG. 11. The area α is an area which is surrounded by the arc ar1 which is obtained by cutting, with the straight lines s1 and s2, a circumference of a circle having a radius R and having the designated point U6 at the center thereof, and the straight lines each connecting one end of the arc ar1 with the origin O5 (not including the origin O5).

Further, when the drawing direction (px, py) is obtained, and then the moved origin coordinates (ox, oy) are obtained from $$ox = ux + (px/L3)*n'$$

$$oy = uy + (py/L3)*n'$$

($R \leq n' < L4$ (the length between O5 and U6)), the origin can be moved to a position within an area β shown in FIG. 12. The area β is a range which is interposed between the straight lines s1 and s2, which form an acute angle, as well as a range which is interposed between the arc ar1 of a circle having a radius R and having the designated point U6 at the center thereof, and the arc ar2 of a circle having a radius of the length between the designated point U6 and the origin O5 and having the designated point U6 at the center thereof (exclusive of points on the arc ar2).

As described above, a position into which the origin is drawn can be adjusted according to the setting values of the parameters m and n (or n'), and a position into which the origin is drawn can be adjusted as an optimal value according to the response or operability for each game.

Conversely, a case where the origin is moved to other than the area β will be described with reference to FIG. 12. In a case where the origin is moved to between the arc ar1 and the designated coordinates U6 (for example, a point O7 shown in FIG. 12), while the player is moving the pressing point in the direction in which the length of the stick input value is increased, the length of the input value is reduced, which does not match the player's controllability. Further, in a case where the origin is moved to a position in front of the straight line s1 on the FIG. 12 (for example, a point O8 shown in FIG. 12), while the player touches a point which is in the diagonally right forward direction from the origin, and changes the touch position to the right, the stick input value has a right backward direction, which does not match the player's controllability. Moreover, in a case where the origin is moved to a position in the backward direction from the straight line s2 on FIG. 12 (for example, a point O9 shown in FIG. 12), while the player moves the touch position to the right, the rightward direction component of the stick input value is reduced, which does not match the player's controllability. In addition, in a case where the origin is moved beyond the arc ar2 in the direction away from the designated point coordinates U6, the distance between the origin and the designated point coordinates becomes longer. As described above, the player's controllability is substantially different between a case where the origin is moved into the area β and a case where the origin is moved to other than the area β.

As described above, according to the present invention, an origin to be set on the touch panel is set as a position at which the player initially touch-operates the touch panel so as to achieve an operation in which a joystick is emulated. Therefore, the player initially touches the touch panel by himself, and thereby the player can controllably feel and know the position of the origin having been set by himself. That is, the player can perceive the position of the origin with his finger, and thereby the player does not have to visually confirm the position of the origin. Further, no origin which is fixedly set on the touch panel is set, and thereby the player can start the operation at any position in the touch panel coordinate system. Furthermore, in a case where the player releases his finger for a short time against his intention, the origin can be prevented from being reset, and in a case where the player intentionally releases his finger (in a case where his fingers are released for more than a predetermined time period), the origin can be reset.

Further, although in this embodiment the origin is drawn before the stick value is obtained, the origin may be drawn after the stick vale is obtained, and when the stick value is obtained next time, the origin having been drawn may be utilized. However, in general, it is preferable that the origin is drawn before the stick value is obtained.

An image of at least one of the origin and the limited range set around the origin, which are described in the aforementioned embodiment, may be displayed on the second LCD 12. According to the present invention, while the player can feel and know the position of the origin without visually checking the touch panel 13, when the origin or the limited range is displayed on the second LCD 12 covered by the touch panel 13, the position of the origin or the limited range of the touch panel 13 can be further displayed to the player in real time.

Further, in this embodiment, a touch point is arbitrarily positioned in a tolerance range having a designated point at the center thereof, and when the touch point deviates beyond the tolerance range, the tolerance range is moved according to the movement of the touch point, and consequently the designated point is moved, thereby making hand jiggling correction for the touch point. However, when the effect of the hand jiggling correction is not required, the hand jiggling correction is not necessarily required to be made. In this case, a touch point is handled as a designated point as it is, and no tolerance range is set and the processing of the step 44 is not performed. In this way, even when a touch point is handled as a designated point as it is, the effect of the present invention can be similarly achieved.

Moreover, in the flow chart shown in FIG. 3, when the player stops touch-operating the touch panel 13 (No. in step 40), in a case where the count value of the non-touch counter CT is greater than a predetermined value C (Yes in step 50), a stick value is set as neutral. However, a stick value having been set before stopping the touch-operation may be continuously handled as a game parameter until the next touch-operation is carried out. In a case where the stick value is continuously handled as a game parameter until the next touch operation is carried out, the player does not have to continue the same touch-operation for a long time, and thereby the same operation can be easily continued.

Moreover, in the flow chart shown in FIG. 3, when the player stops touch-operating the touch panel 13 and then carries out a touch-operation again, an origin is newly set. However, when the next touch-operation is carried out, a relative positional relationship between a designated point and an origin may be continuously used. For example, the relative positional relationship between the origin and the designated point, which are used in step 48 before stopping the touch-operation, is stored, and when the touch-operation is restarted, the touch point may be set as the designated point. The relative positional relationship having been stored is used to set an origin on the basis of the designated point. In general, when the player touch-operates an area other than the touch panel 13 during the touch-operation on the touch panel 13, the player touch-operates a different position on the touch panel 13 again and attempts to continue the same operation. Also when the touch-operation is carried out again as described above, since the relative positional relationship between the origin and the designated point is maintained, the player can enjoy the game without the operation being interrupted. Further, the origin can be also set outside the touch panel 13, and thereby a wide range of game operations can be provided.

Further, the origin according to this embodiment does not have to be a touch panel origin. That is, the touch panel origin is fixed and another reference point may be used and changed as a reference for stick input.

While in this embodiment a touch panel is used as an input device for carrying out an operation in which a joystick is emulated, other pointing devices can be used. Here, the pointing device is an input device which designates an input position or coordinates on a screen. For example, when a mouse, a track pad, a track ball or the like is used as an input device and information concerning a screen coordinate system, which is obtained on the basis of an output value which is outputted by the input device, is used, the present invention can be realized in a similar manner. In a case where a pointing device such as to a mouse is used, a touch state and a non-touch state correspond an ON and an OFF of click button, respectively, and the game apparatus or the like may calculate coordinates on the basis of an output value which is outputted from the mouse or the like.

In addition, in this embodiment, the touch panel 13 is integrated into the game apparatus 1. Needless to say, however, also when the game apparatus and the touch panel are separately provided, the present invention can be realized. Further, while in this embodiment two display devices are provided, the number of display devices provided can be only one. That is, in this embodiment, it is also possible to provide only the touch panel 13 without the second LCD 12 being provided. In addition, in this embodiment, the second LCD 12 is not provided and the touch panel 13 may be provided on the upper principal face of the first LCD 11.

Moreover, while in this embodiment the touch panel 13 is integrated into the game apparatus 1, the touch panel is used as one of input devices for an information processing apparatus such as a typical personal computer. In this case, a program executed by the computer in the information processing apparatus is not limited to a game program which is typically used for a game, and the program is a general-purpose program in which the stick value obtained in the above-described manner is used for processing in the information processing apparatus.

Further, in this embodiment, when designated point coordinates deviate beyond the limited range, an origin is drawn. However, the origin may be drawn under another condition. For example, when an angle between the origin and the designated point coordinates is different from the angle obtained at the previous input, or when an angle between the origin and the designated point coordinates is greater than a predetermined angle, the origin may be drawn.

While the present invention has been described in detail, the foregoing description is in all aspects illustrative and not restrictive. It is understood that numerous other modifications and variations can be devised without departing form the scope of the invention.

What is claimed is:

1. An information processing apparatus comprising:
a touchscreen display; and
processing circuitry in communication with the touchscreen display, the processing circuitry being configured to generate images for a video game for display on the touchscreen display and, while the images for the video game are displayed on the touchscreen display, at least:
set reference coordinates in accordance with touch point coordinates of a user-selected initial touch point on the touchscreen display;
during a continuous user touch operation from a touch-on at the initial touch point on the touchscreen display to a touch-off at another touch point on the touchscreen display;
(i) generate an input for the video game based on one or both of a distance and direction from the set reference coordinates to coordinates of a current touch point on the touchscreen display;
(ii) determine whether a distance between the set reference coordinates and the coordinates of the current touch point exceeds a predetermined distance and, if so, determine adjusted reference coordinates and then set the adjusted reference coordinates as the reference coordinates; and
(iii) repeat (i) and (ii) until the continuous user touch operation ends.

2. The information processing apparatus according to claim 1, wherein the adjusted reference coordinates are determined so as to be located on a line extending between the set reference coordinates and the coordinates of the current touch point.

3. The information processing apparatus according to claim 2, wherein the adjusted reference coordinates are determined so that a distance between the adjusted reference coordinates and the coordinates of the current touch point is equal to the predetermined distance.

4. The information processing apparatus according to claim 1, wherein the distance between the set reference coordinates and the coordinates of the current touch point corresponds to a tilt amount of an emulated joystick and the direction from the set reference coordinates to the coordinates of the current touch point corresponds to a tilt direction of the emulated joystick.

5. The information processing apparatus according to claim 1, wherein the adjusted reference coordinates are determined based on at least the direction from the set reference coordinates to the coordinates of the current touch point.

6. The information processing apparatus according to claim 1, wherein at least the direction is used for generating the input for the video game and at least distance is used for determining the adjusted reference coordinates.

7. The information processing apparatus according to claim 6, wherein both of the direction and the distance are used for generating the input for the video game.

8. The information processing apparatus according to claim 1, wherein the processing circuitry is configured to visually indicate the set reference coordinates on the touchscreen display.

9. A non-transitory computer-readable medium storing a program for use in an information processing apparatus comprising a touchscreen display, a memory and processing circuitry in communication with the touchscreen display and the memory, the program, when executed by the processing circuitry, controlling the information processing apparatus to at least:

generate images for a video game for display on the touchscreen display; and while the images for the video game are displayed on the touchscreen display set reference coordinates in accordance with touch point coordinates of a user-selected initial touch point on the touchscreen display;

during a continuous user touch operation from a touch-on at the initial touch point on the touchscreen display to a touch-off at another touch point on the touchscreen display (i) generate an input for the video game based on one or both of a distance and direction from the set reference coordinates to coordinates of a current touch point on the touchscreen display;

(ii) determine whether a distance between the set reference coordinates and the coordinates of the current touch point exceeds a predetermined distance and, if so, determine adjusted reference coordinates and then set the adjusted reference coordinates as the reference coordinates; and (iii) repeat (i) and (ii) until the continuous user touch operation ends.

10. The non-transitory computer-readable medium according to claim 9, wherein the adjusted reference coordinates are determined so as to be located on a line extending between the set reference coordinates and the coordinates of the current touch point.

11. The non-transitory computer-readable medium according to claim 10, wherein the adjusted reference coordinates are determined so that a distance between the adjusted reference coordinates and the coordinates of the current touch point is equal to the predetermined distance.

12. The non-transitory computer-readable medium according to claim 9, wherein the distance between the set reference coordinates and the coordinates of the current touch point corresponds to a tilt amount of an emulated joystick and the direction from the set reference coordinates to the coordinates of the current touch point corresponds to a tilt direction of the emulated joystick.

13. The non-transitory computer-readable medium according to claim 9, wherein the adjusted reference coordinates are determined based on at least the direction from the set reference coordinates to the coordinates of the current touch point.

14. The non-transitory computer-readable medium according to claim 9, wherein at least the direction is used for generating the input for the video game and at least distance is used for determining the adjusted reference coordinates.

15. The non-transitory computer-readable medium according to claim 14, wherein both of the direction and the distance are used for generating the input for the video game.

16. The non-transitory computer-readable medium according to claim 9, wherein the processing circuitry is configured to visually indicate the set reference coordinates on the touchscreen display.

\* \* \* \* \*